(12) United States Patent
Sigioltzakis et al.

(10) Patent No.: US 11,760,193 B2
(45) Date of Patent: Sep. 19, 2023

(54) RESERVOIR TANK CAP CLOSURE INDICATORS

(71) Applicant: Illinois Tool Works Inc., Glenview, IL (US)

(72) Inventors: Louis A. Sigioltzakis, Des Plaines, IL (US); Joseph C. Kuhn, Des Plaines, IL (US); John S. Pontaoe, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1049 days.

(21) Appl. No.: 16/131,830

(22) Filed: Sep. 14, 2018

(65) Prior Publication Data

US 2019/0100100 A1  Apr. 4, 2019

Related U.S. Application Data

(60) Provisional application No. 62/613,115, filed on Jan. 3, 2018, provisional application No. 62/585,035, filed on Nov. 13, 2017, provisional application No. 62/565,258, filed on Sep. 29, 2017.

(51) Int. Cl.
*B65D 51/24* (2006.01)
*B60K 15/05* (2006.01)
*B60K 15/04* (2006.01)

(52) U.S. Cl.
CPC .......... *B60K 15/05* (2013.01); *B60K 15/0406* (2013.01); *B65D 51/245* (2013.01); *B60K 2015/0438* (2013.01); *B60K 2015/0546* (2013.01); *B60K 2015/0561* (2013.01); *B60Y 2400/92* (2013.01)

(58) Field of Classification Search
CPC .. B60K 51/245; B60K 15/05; B60K 15/0406; B60K 2015/0438; B60K 2015/0561; B60K 2015/0546; B60K 2015/0515; B60Y 2400/92
USPC .......................................................... 220/288
See application file for complete search history.

(56) References Cited

U.S. PATENT DOCUMENTS

| | | | | |
|---|---|---|---|---|
| 3,587,912 | A | * | 6/1971 | Nagoya et al. ...... F01P 11/0247 220/203.26 |
| 4,510,893 | A | * | 4/1985 | Schweiger ........... F01P 11/0247 123/41.1 |
| 4,529,099 | A | * | 7/1985 | Zerrer ................ B60K 15/0406 215/221 |
| 4,535,905 | A | | 8/1985 | Sandhaus |
| 4,535,910 | A | * | 8/1985 | Nagashima ........... F16N 19/003 220/377 |

(Continued)

FOREIGN PATENT DOCUMENTS

| DE | 3207049 A1 * | 9/1983 | ........... B65D 50/041 |
|---|---|---|---|
| DE | 202006013416 U1 | 1/2008 | |

OTHER PUBLICATIONS

European Search Report for European Patent Application No. 18195888.5, dated Mar. 6, 2019.

*Primary Examiner* — Ernesto A Grano
(74) *Attorney, Agent, or Firm* — Quarles & Brady LLP (57) ABSTRACT

A reservoir cap closure indicator coupled to a cap comprises a body configured to move between a first position and a second position. An indicator coupled to the body indicates a position of the reservoir cap closure indicator as the body moves between the first position and the second position.

19 Claims, 10 Drawing Sheets

(56) References Cited

U.S. PATENT DOCUMENTS

| | | | | |
|---|---|---|---|---|
| 4,753,189 | A * | 6/1988 | Mastman | A61J 7/04 |
| | | | | 215/222 |
| 5,819,968 | A * | 10/1998 | Jones | B65D 50/043 |
| | | | | 215/230 |
| 5,938,081 | A | 8/1999 | Foster et al. | |
| 5,967,350 | A * | 10/1999 | Jones | B65D 51/245 |
| | | | | 215/230 |
| 6,079,582 | A * | 6/2000 | Nickel | B60K 15/0406 |
| | | | | 220/234 |
| 6,478,180 | B1 * | 11/2002 | Dehn, Sr. | B65D 51/18 |
| | | | | 215/276 |
| 6,729,330 | B2 * | 5/2004 | Scarrott | G06M 1/283 |
| | | | | 128/200.23 |
| 8,201,691 | B1 * | 6/2012 | Chowdhury | A61J 7/04 |
| | | | | 116/306 |
| 9,096,120 | B2 * | 8/2015 | Jean | B60K 15/00 |
| 2003/0127416 | A1 * | 7/2003 | Salazar-Leal | B65D 51/245 |
| | | | | 215/230 |
| 2008/0110848 | A1 * | 5/2008 | Lantos | B65D 51/226 |
| | | | | 215/313 |
| 2012/0138563 | A1 * | 6/2012 | Brumfield | B65D 51/18 |
| | | | | 215/230 |
| 2012/0305599 | A1 * | 12/2012 | Painchaud | B65D 47/2087 |
| | | | | 222/189.06 |
| 2013/0140225 | A1 * | 6/2013 | Decock | B05B 11/0008 |
| | | | | 422/509 |
| 2014/0174580 | A1 | 6/2014 | Jean | |
| 2014/0332494 | A1 * | 11/2014 | Balakier | B65D 1/0246 |
| | | | | 215/365 |
| 2014/0367291 | A1 * | 12/2014 | Lopez | A47G 23/16 |
| | | | | 206/459.1 |
| 2014/0374301 | A1 * | 12/2014 | West | G09F 9/00 |
| | | | | 206/459.5 |

* cited by examiner

RESERVOIR TANK CAP CLOSURE INDICATORS

RELATED APPLICATIONS

This application relates to and claims priority benefits from U.S. Provisional Patent Application No. 62/565,258, entitled "Reservoir Tank Cap Closure Indicator," filed Sep. 29, 2017, which is hereby incorporated by reference in its entirety.

This application also relates to and claims priority benefits from U.S. Provisional Patent Application No. 62/585,035, entitled "Reservoir Tank Cap Closure Indicator," filed Nov. 13, 2017, which is hereby incorporated by reference in its entirety.

This application also relates to and claims priority benefits from U.S. Provisional Patent Application No. 62/613,115, entitled "Reservoir Tank Cap Closure Indicators," filed Jan. 3, 2018, which is hereby incorporated by reference in its entirety.

FIELD OF EMBODIMENTS OF THE DISCLOSURE

Embodiments of the present disclosure generally relate to tank closure caps, and more particularly to indicators used to confirm that a tank cap is in a fully closed position. Indicators consistent with the present disclosure permit verification by an individual that a cap sealingly coupled to a reservoir tank is in a fully tightened and installed condition.

BACKGROUND

Fluid reservoir tanks are used in automotive vehicles and other environments of use in which fluids are required. Fluids are typically stored in such reservoir tanks for use in various defined applications and may be refilled as needed when desired fluid levels become depleted. Reservoir tanks typically incorporate a mouth opening that is normally closed by a removable cap. When refilling is required, the cap is removed while fresh fluid is introduced. The cap can then be closed again to create a sealed condition.

Typical past reservoir tank systems have used removable caps including a downwardly projecting bump feature on the threaded portion of the cap. When the cap is fully tightened, the bump feature interferes with an element projecting away from the neck of the tank opening. However, in some instances it may be difficult for an assembly worker or other user to know when the cap has been fully tightened and installed based exclusively on such interference. Moreover, the existing bump features are located on the underside of the cap, out of view. In the event that a cap is not fully tightened, the fluid contained in the reservoir tank may be lost (such as through spilling and/or leaking out of the reservoir tank).

Figure 1:
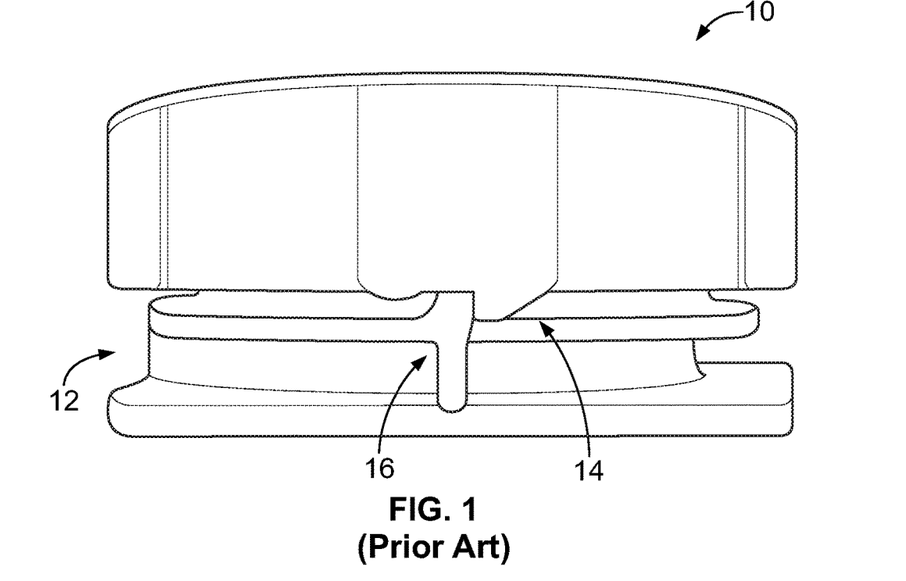
FIG. 1 illustrates a known cap closure indicator.

FIG. 1 illustrates a known cap closure indicator of a cap 10. The cap closure indicator includes a downwardly extending bump feature 14. A known reservoir neck 12 includes a molded tab 16 extending upwardly from an annular rim. The tab 16 is disposed radially outward from a threaded neck portion onto which the cap 10 is configured to threadably secure. As shown in FIG. 1, the downwardly projecting bump feature 14 is adapted to engage the tab 16 on the reservoir neck 12 when the cap 10 is fully tightened on the reservoir neck 12. The tab 16 provides a barrier that provides a hard stop for the cap 10. That is, the tab 16 is configured to cooperate with a portion of the cap 10 to prevent further rotation of the cap 10 with respect to the neck 12. However, with repeated use, the plastic tab 16 may wear, and eventually deform. Moreover, while such an indicator may work well generally, an inattentive or inexperienced user may fail to recognize a situation in which the cap 10 is not fully tightened. In the event that the cap 10 is not fully tightened, the cap 10 may be lost and/or a fluid may be unintentionally expelled from the reservoir.

SUMMARY OF EMBODIMENTS OF THE DISCLOSURE

A need exists for a reservoir tank cap closure indicator that may readily and easily identify a closure status. Embodiments of the present disclosure provide advantages and alternatives over the prior art by providing reservoir tank closure indicators that provide visual and/or audible indicators that a reservoir cap is in a fully installed and closed condition. Thus, an individual is not dependent exclusively upon interference and feel to confirm proper closure.

With those needs in mind, certain embodiments of the present disclosure provide a reservoir cap closure indicator coupled to a cap. The reservoir cap closure indicator comprises a body configured to move between a first position and a second position. An indicator coupled to the body indicates a position of the reservoir cap closure indicator as the body moves between the first position and the second position.

In at least one embodiment, the reservoir cap closure indicator also includes a locking member coupled to the body. The locking member engages the cap as the body of the reservoir cap closure indicator moves between the first position and the second position.

Optionally, the locking member is one or more of one or more of a spring, a tab, a detent, or a protuberance.

In at least one embodiment, the body includes an alignment feature configured to align the body of the reservoir cap closure indicator with the cap.

In at least one embodiment, the indicator indicates when the body is in the second position and when the body is not in the second position.

In at least one embodiment, the indicator is configured to indicate the position of the reservoir cap closure indicator as one or more of an audio indicator or a visual indicator.

Optionally, the reservoir cap closure indicator is disposed inside the cap and the indicator is configured to be visible outside of the cap at a top side of the cap.

In at least one embodiment, the body, the locking member, and the indicator are integrally formed of a unitary component.

Optionally, the reservoir cap closure indicator is disposed between the cap and the reservoir.

In at least one embodiment, the indicator is configured to extend through a channel of the cap when the body of the reservoir cap closure indicator is in the second position.

Certain embodiments of the present disclosure also provide a reservoir cap closure indicator system comprising a cap and a reservoir cap closure indicator. The cap is configured to be removably coupled to a neck of a reservoir and move between an installed state and an uninstalled state. The reservoir cap closure indicator comprises a body that is configured to move between a first position and a second position. An indicator coupled to the body indicates a position of the reservoir cap closure indicator as the body moves between the first position and the second position. When the cap is in the uninstalled state, the body is in the first position, and when the cap is in the installed state, the body is in the second position.

In at least one embodiment, the reservoir cap closure indicator remains coupled to the cap when the cap is removed from the neck of the reservoir.

Optionally, the cap also includes a channel. The indicator is configured to extend through the channel of the cap when the body of the reservoir cap closure indicator is in the second position.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Figure 2:
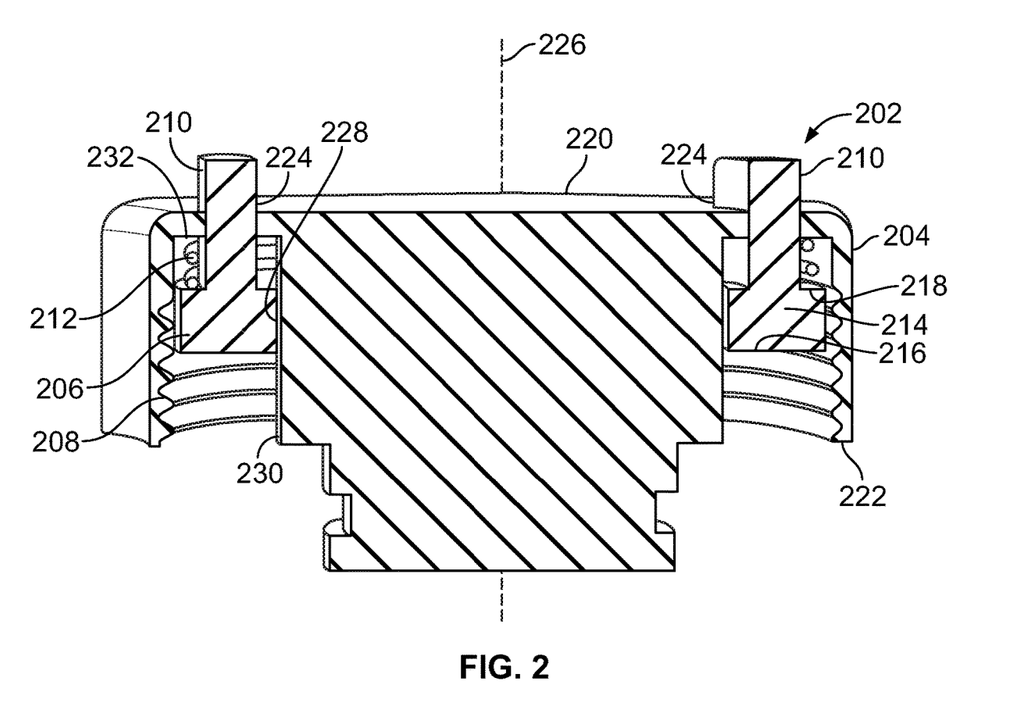
FIG. 2 illustrates a cross-sectional view of a reservoir cap closure indicator, according to an embodiment of the present disclosure.
Figure 3:
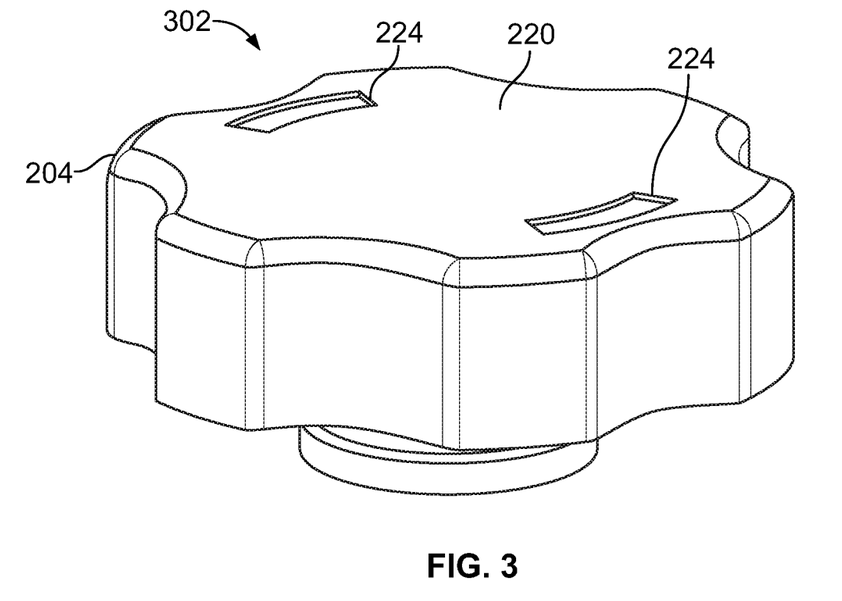
FIG. 3 illustrates the reservoir cap closure indicator of FIG. 2 in a first position.
Figure 4:
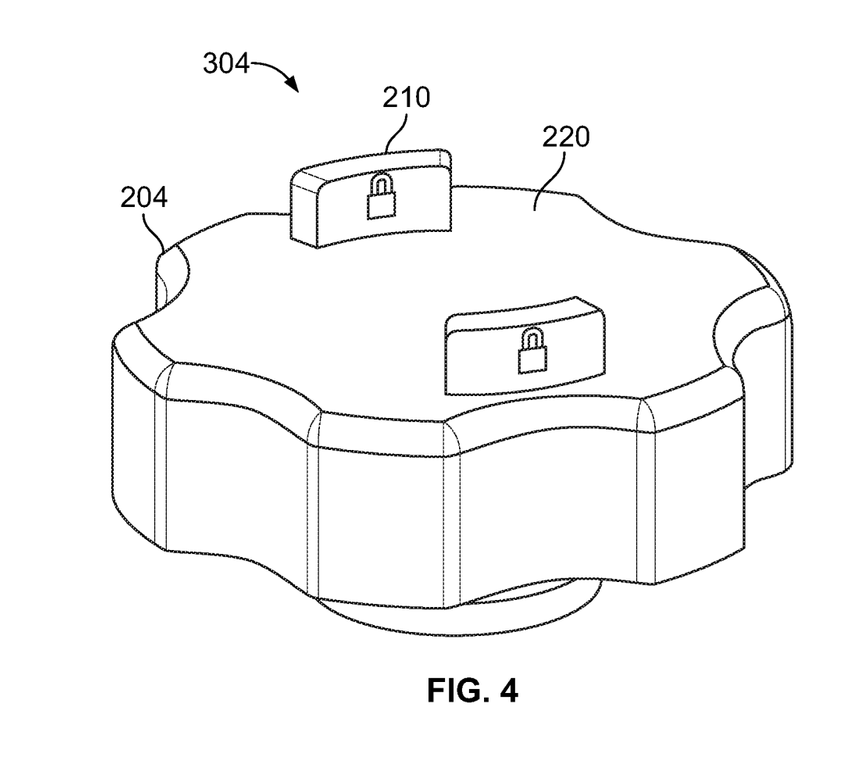
FIG. 4 illustrates the reservoir cap closure indicator of FIG. 2 in a second position.

FIGS. 2 through 4 illustrate an exemplary embodiment of an improved reservoir cap closure indicator 202, according to an embodiment of the present disclosure. FIG. 2 illustrates a cross-sectional view of the reservoir cap closure indicator 202. FIG. 3 illustrates the reservoir cap closure indicator 202 in a first position 302, and FIG. 4 illustrates the reservoir cap closure indicator 202 in a second position 304.

The reservoir cap closure indicator 202 is disposed inside a cap 204 that may be coupled to a neck of a reservoir (not shown in FIGS. 2 through 4). The cap 204 includes and extends between a top side 220 to a bottom side 222 along an axis 226 and the cap 204 further includes internal threads 208 that may couple to corresponding threads of the neck of the reservoir. The reservoir cap closure indicator 202 includes a body 206 that includes an alignment feature 228 that aligns the reservoir cap closure indicator 202 with the cap 204. In the illustrated embodiment, the alignment feature 228 is a center passage of a base ring 214 of the body 206 that is substantially centered about the axis 226. The alignment feature 228 extends at least partially about a center portion 230 of the cap 204 that extends downwardly from the top side 220 of the cap 204. Optionally, the alignment feature 228 may extend around only a portion of the center portion 230 of the cap 204.

The body 206 of the reservoir cap closure indicator 202 includes a base ring 214 that extends around the alignment feature 228. The base ring 214 includes a top surface 218 and a bottom surface 216. In the illustrated embodiment, the top surface 218 is positioned facing toward the top side 220 of the cap 204. The reservoir cap closure indicator 202 also includes indicators 210 that extend upwardly a distance away from the top surface 218 of the base ring 214. In the illustrated embodiment, the reservoir cap closure indicator 202 includes two indicators 210 that are illustrated as flags. By way of example only, and not limitation, the indicators 210 can be raised text that extends past the top side 220 of the cap 204 (example "CLOSED"), or geometric shapes or tabs as illustrated, etc. The flag feature may also be of a contrasting color relative to the body 206 of the cap 204 if desired to further facilitate visual identification.

The indicators 210 are shaped and sized to correspond with channels 224 formed through the cap 204, wherein the channels 224 provide open passages within the top side 220 of the cap 204. The body 206 moves between the first position 302, as seen in FIG. 3, and the second position 304, as seen in FIG. 4, responsive to the cap 204 moving between an uninstalled state and an installed state. For example, the reservoir cap closure indicator 202 moves responsive to the cap 204 being twisted and coupled to the neck of the reservoir. The indicators 210 indicate a position of the reservoir cap closure indicator 202. For example, FIG. 3 illustrates the reservoir cap closure indicator 202 in the first position 302. When the cap 204 is uninstalled on the neck of the reservoir, the indicators 210 do not extend through the channels 224 of the cap 204. Optionally, the indicators 210 moving between the first position 302 and the second position 304 may also create an audible noise as well as a visual indication of installation, thereby providing further confirmation of closure. For example, the indicators 210 may indicate the position of the reservoir cap closure indicator 202 by means of a visual indication or an audio indication.

As the body 206 of the reservoir cap closure indicator 202 moves from the first position 302 (e.g., when the cap 204 is uninstalled) to the second position 304 as shown in FIG. 4, a top surface (not shown in FIGS. 2 through 4) of the reservoir or a top surface of a neck of the reservoir contacts the bottom surface 216 of the base ring 214 to which it is mated. In order to contact the top surface of the reservoir, the cap 204 engages threads of the neck of the reservoir nearly fully. Locking members 212, coupled to the body 206, engage an interior surface 232 of the cap 204. In the illustrated embodiment, the locking members 212 are return springs that are coupled to the top surface 218 of the base ring 214 and extend around the indicators 210 between the top surface 218 and the interior surface 232 of the cap 204. The return springs may be used to retract the reservoir cap closure indicator 202 when no force is applied, thereby indicating a resting state when the cap 204 is not threaded to the neck of the reservoir (e.g., when the body 206 of the reservoir cap closure indicator 202 is in the first position 302). By way of example only, and not limitation, the locking members 212 may be coiled compression springs, or may be plastic springs molded into the cap 204 and/or the base ring 214 or otherwise attached to the cap 204 and/or the base ring 214. Of course, other return mechanisms may likewise be used if desired. In alternative embodiments, the reservoir cap closure indicator 202 may be retracting to a resting state via gravity.

As shown in FIGS. 2 and 4, in order to indicate the fully installed state of the cap 204 and the reservoir cap closure indicator 202 in the second position 304, the indicators 210 are raised through the channels 224 in the top side 220 of the cap 204 when the cap 204 is fully tightened onto the neck of the reservoir. As will be appreciated, by positioning the indicators 210 to extend through the channels 224 at the top side 220 of the cap 204, an operator can easily confirm that installation has been properly completed. The reservoir cap closure indicator 202 is disposed inside the cap 204 and the indicators 210 are visible outside of the cap 204 at the top side 220 of the cap 204. For example, the indicators 210 can be viewed to indicate when the reservoir cap closure indicator 202 is in the second position 304. Alternatively, the indicators 210 are not visible from the top side 220 of the cap 204 when the reservoir cap closure indicator 202 is not in the second position 304 (e.g., as shown in FIG. 3).

Figure 5:
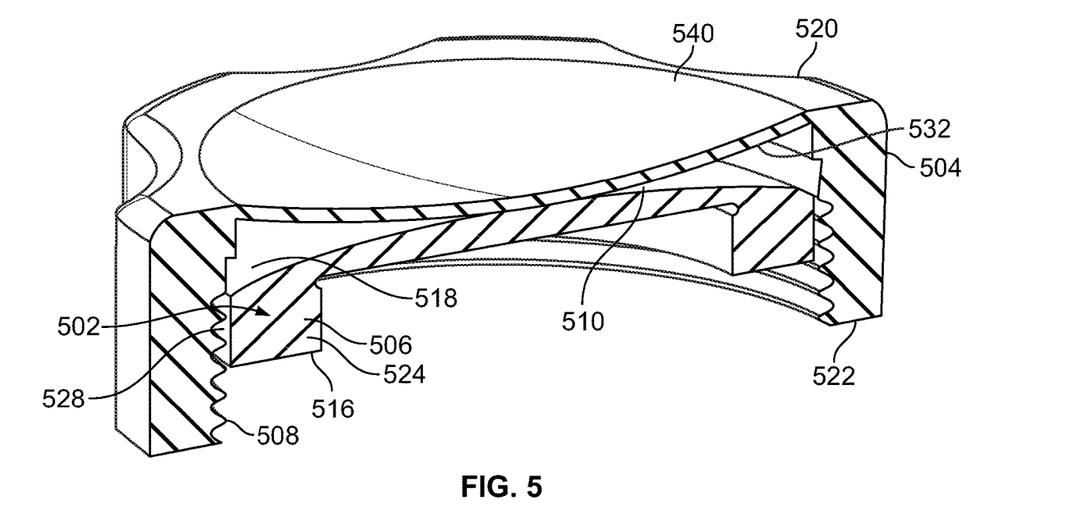
FIG. 5 illustrates a cross-sectional view of a reservoir cap closure indicator, according to a further embodiment of the present disclosure.
Figure 6:
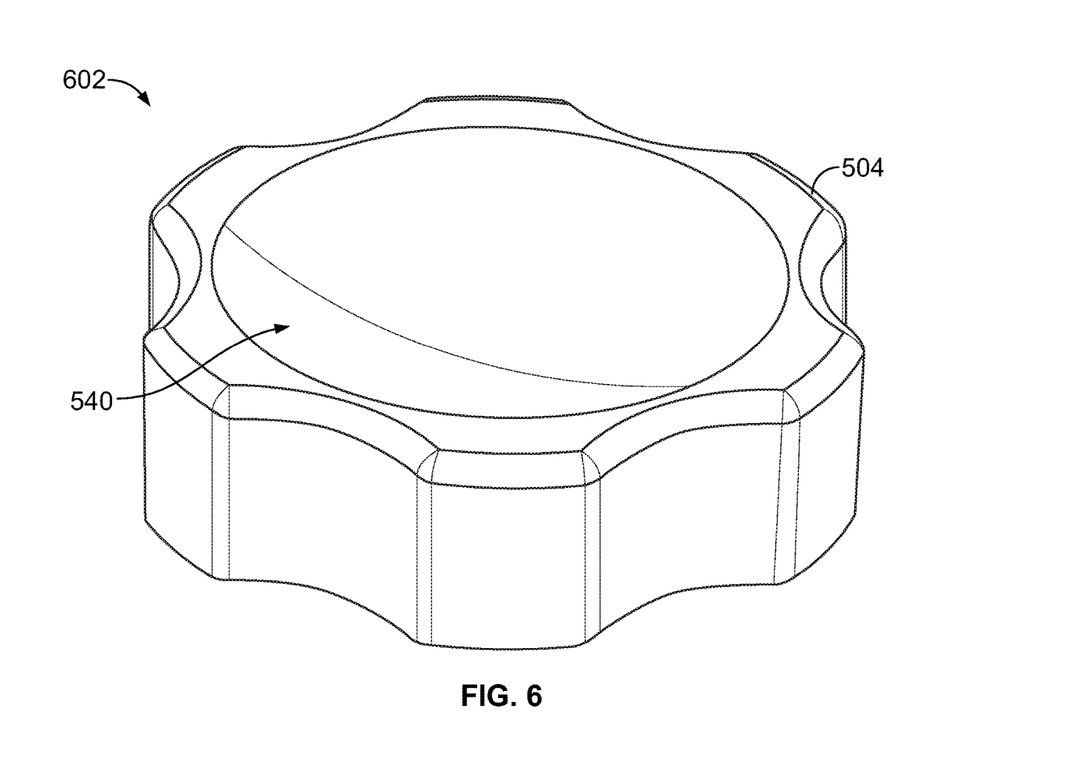
FIG. 6 illustrates the reservoir cap closure indicator of FIG. 5 in a first position.
Figure 7:
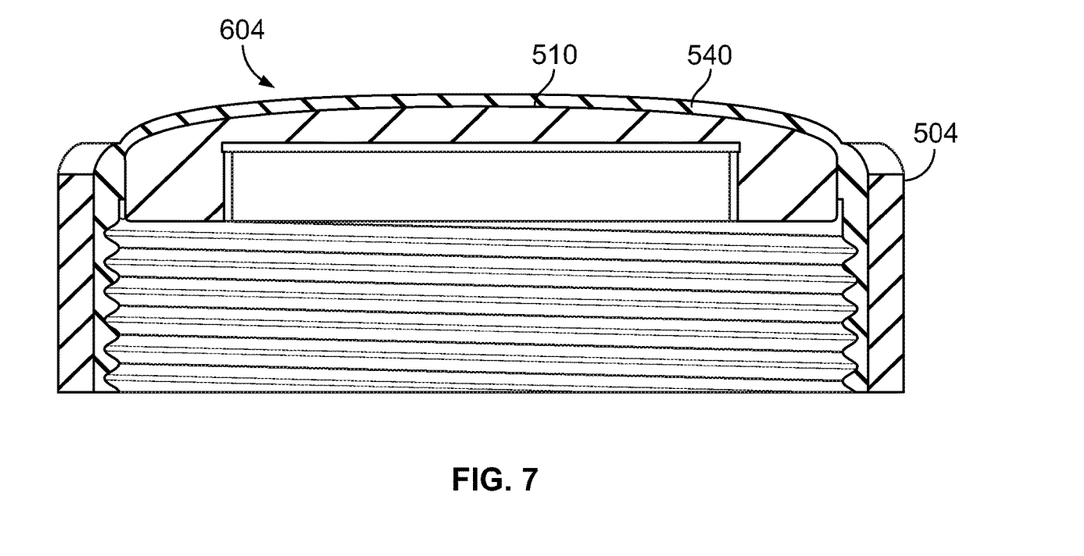
FIG. 7 illustrates the reservoir cap closure indicator of FIG. 5 in a second position.

FIGS. 5 through 7 illustrate a set of views of an exemplary embodiment for a reservoir cap closure indicator 502, according to another embodiment of the present disclosure. FIG. 5 illustrates a cross-sectional view of the reservoir cap closure indicator 502. FIG. 6 illustrates the reservoir cap closure indicator 502 in a first position 602. FIG. 7 illustrates the reservoir cap closure indicator 502 in a second position 604.

The reservoir cap closure indicator 502 is disposed inside a cap 504 that may be coupled to a neck of a reservoir (not shown in FIGS. 5 through 7). The cap 504 includes and extends between a top side 520 and a bottom side 522, and the cap 504 further includes internal threads 508 that may be coupled to corresponding threads of the neck of the reservoir. The cap 504 also includes a flexible surface 540 that extends along a portion of the top side 520 of the cap 504. When the cap 504 is in a resting or uninstalled state (e.g., the cap 504 is not coupled to the neck of the reservoir), the flexible surface 540 is generally concave. Alternatively, when the cap is in the installed or closed state (e.g., the cap 504 is installed on the reservoir), the flexible surface 540 may be deformed to have a generally convex shape.

The reservoir cap closure indicator 502 includes a body 506 that has a size that substantially fills the inside of the cap 504. The body 506 comprises a ring 524 that includes a bottom surface 516 and a top surface 518. A generally convex indicator 510 extends along and across at least a portion of the top surface 518 of the body 506 such that the indicator 510 faces an interior surface 532 of the flexible surface 540 of the cap 504. The body 506 also includes an alignment feature 528 that is shaped and sized to align the reservoir cap closure indicator 502 inside the cap 504 along an interior perimeter surface of the cap 504.

As shown in FIGS. 5 through 7, the normally concave flexible surface 540 of a cap 504 becomes convex upon full installation of the cap 504. For example, FIG. 6 illustrates the reservoir cap closure indicator 502 in a first position 602. When the cap 504 is uninstalled on the neck of the reservoir, the indicator 510 does not interfere with or deform the flexible surface 540 of the cap 504. In the illustrated, exemplary embodiment, the change in surface curvature of the flexible surface 540 is achieved by the body 506 of the reservoir cap closure indicator 502, which is raised by contact with a mating surface of the mating reservoir (not shown) when the cap 504 is threaded onto the mating neck of the reservoir.

FIG. 7 illustrates the reservoir cap closure indicator 502 in the second position 604. When the threads 508 of the cap 504 are sufficiently engaged and the cap 504 is fully installed, the mating part (e.g., the reservoir), which is positioned below the body 506, pushes the bottom surface 516 of the body 506 of the reservoir cap closure indicator 502 upwardly toward the interior surface 532 of the cap 504. The indicator 510, which is generally convex and protrudes away from the body 506, pushes the interior surface 532 of the cap 504 and causes the flexible surface 540 of the cap 504 to deform. Such deformation continues until the flexible surface 540 becomes convex, indicating a full installation. Optionally, the convex shape of the flexible surface 540 of the cap 504 in the installed state may also create an audible noise as well as a visual indication of installation, thereby providing further confirmation of closure.

Figure 8:
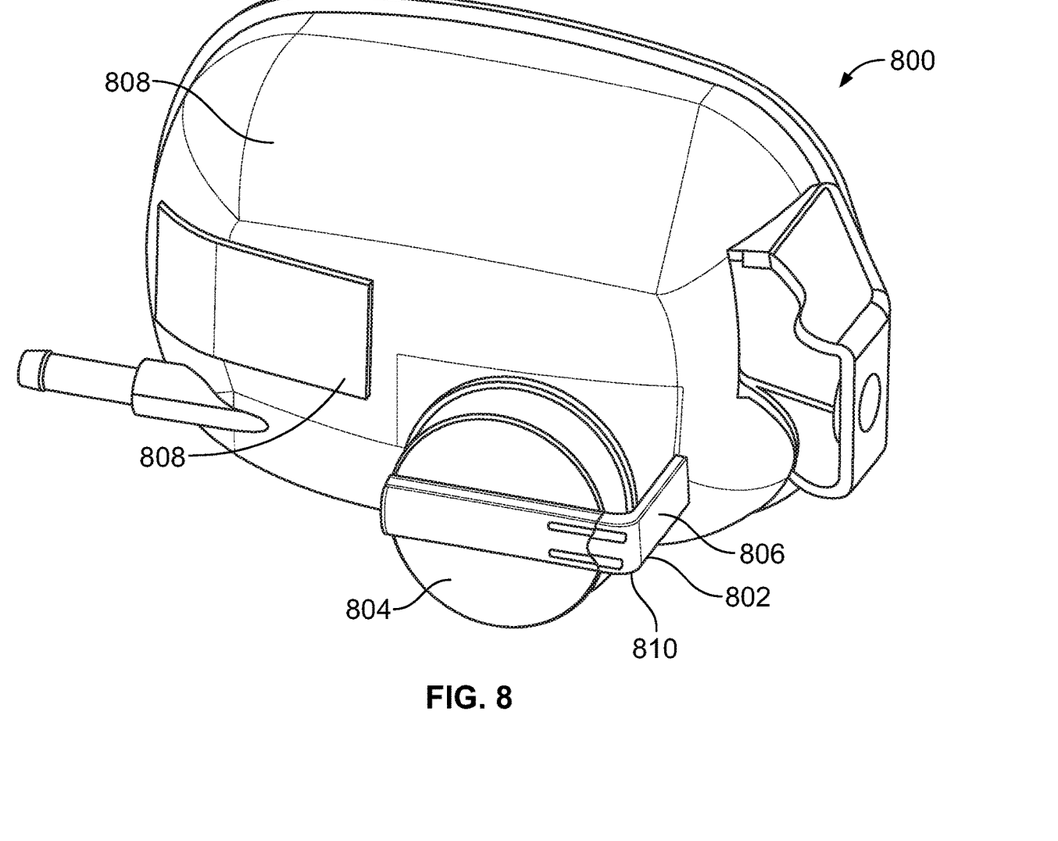
FIG. 8 illustrates a perspective view of a reservoir cap closure indicator system, according to a further embodiment of the present disclosure.
Figure 9:
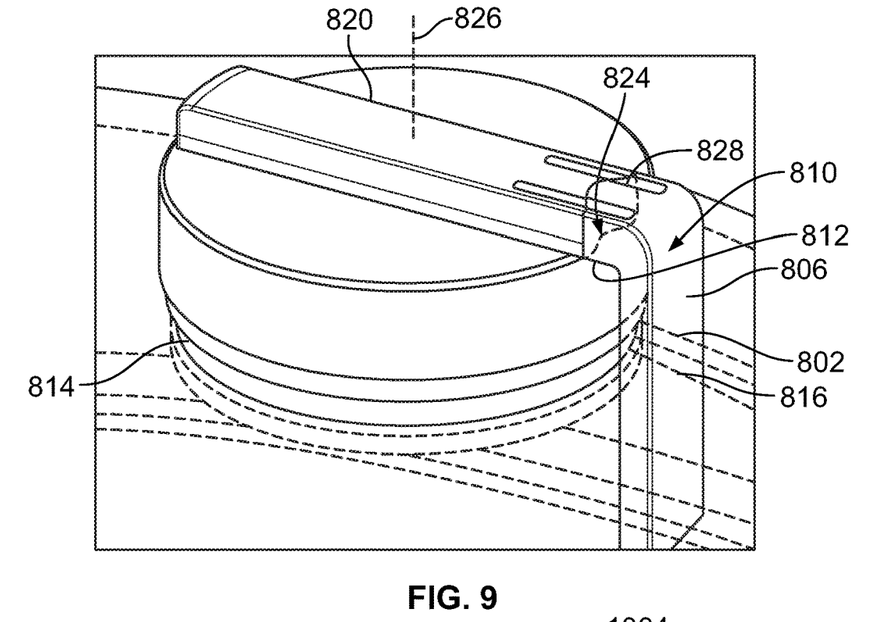
FIG. 9 illustrates a wire-frame perspective view of the reservoir cap closure indicator system of FIG. 8.

FIGS. 8 and 9 illustrates a reservoir cap closure indicator 802, according to another embodiment of the present disclosure. FIG. 8 illustrates a perspective view of a reservoir cap closure indicator system 800. FIG. 9 illustrates a wireframe perspective view of the reservoir cap closure indicator system 800.

The reservoir cap closure indicator system 800 includes a cap 804 that includes a pronounced cap detent 824 that is depressed a distance away from a top side 820 of the cap 804. The cap 804 is coupled to a neck 814 of a reservoir body 808 (or any other suitable portion of the reservoir body 808). In the illustrated embodiment, the system 800 includes a reservoir cap closure indicator 802 having an indicator 810 that is shown as a flexible spring arm that is coupled to the reservoir body 808. The reservoir cap closure indicator 802 (e.g., the spring arm) corresponds to the cap detent 824 when the cap 804 is fully installed onto the neck 814 of the reservoir body 808.

The reservoir cap closure indicator 802 includes a body 806 that has an arm 816 that extends in a direction substantially parallel to an axis 826 of the neck 814 of the reservoir body 808, and an alignment feature 828 that extends in a direction substantially perpendicular to the axis 826. The alignment feature 828 aligns with the cap detent 824 to align the reservoir cap closure indicator 802 with the cap 804. The body 806 also includes a locking member 812 that engages with the top side 820 of the cap 804. The locking member 812 may be a tab that is shaped and sized to be coupled with the cap detent 824 or may be any other suitable locking mechanism.

In the illustrated embodiment, the indicator 810 is shown as a flexible spring arm that indicates when the body 806 is in the first position or in the second position. When the cap 804 is threaded onto the neck 814 of the reservoir body 808, the indicator 810 bends or deflects laterally and glides along the top side 820 of the cap 804 until the cap 804 is threaded far enough for the locking member 812 to engage the cap detent 824. For example, the deformed indicator 810 indicates that the body 806 of the reservoir cap closure indicator 802 is in a first position (e.g., the cap 804 is in an uninstalled state). This is due to the indicator 810 (e.g., the spring arm) interfering with the placement of the cap 804 unless the cap detent 824 is aligned with the locking member 812.

When the cap detent 824 is reached, the locking member 812 moves into the cap detent 824 and the indicator 810 snaps back into a non-deformed state and indicates that the body 806 of the reservoir cap closure indicator is in the second position (e.g., the cap 804 is in an installed state). The reservoir cap closure indicator 802 visually indicates when the body 806 is in the first or second position. For example, the operator may see that the indicator 810 is in a deformed state or in a non-deformed state. The indicator 810 may indicate the position of the reservoir cap closure indicator 802 as a visual indicator (e.g., snapping back into a non-deformed state) and as an audio indicator by creating an audible click. The cap 804 in the installed state results in the locking member 812 resting in the mating cap detent 824, indicating full and proper installation. In alternative embodiments, the locking member 812 falling into the cap detent 824 may also align geometric features or text for additional visual/tactile indication methods.

Figure 10:
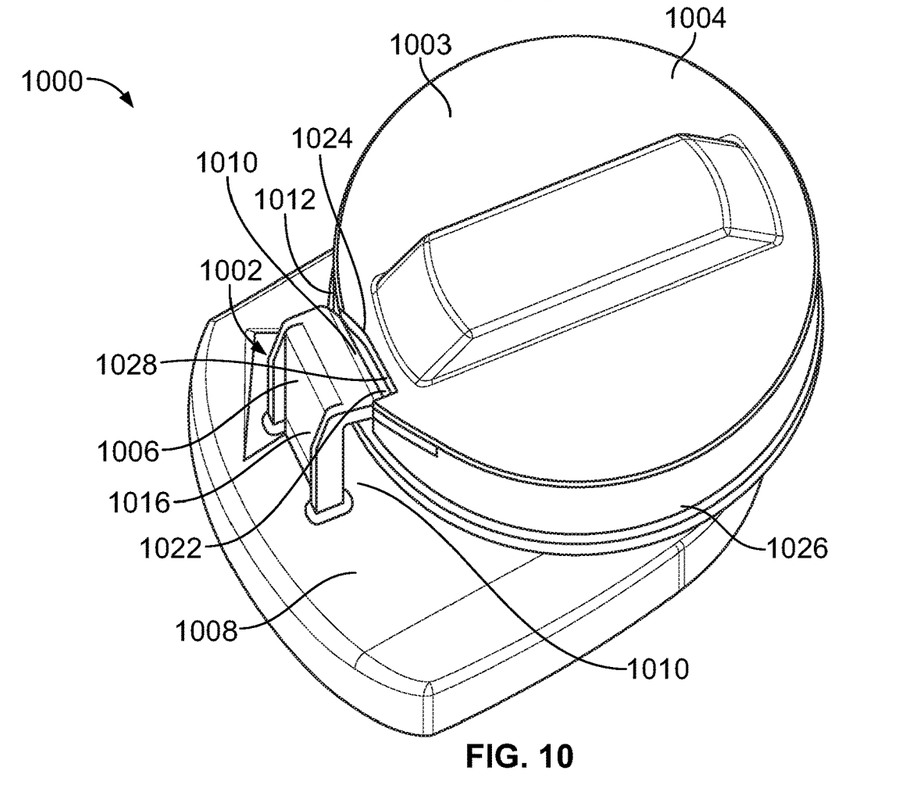
FIG. 10 illustrates a perspective view of a reservoir cap closure indicator system, according to another embodiment of the present disclosure.
Figure 11:
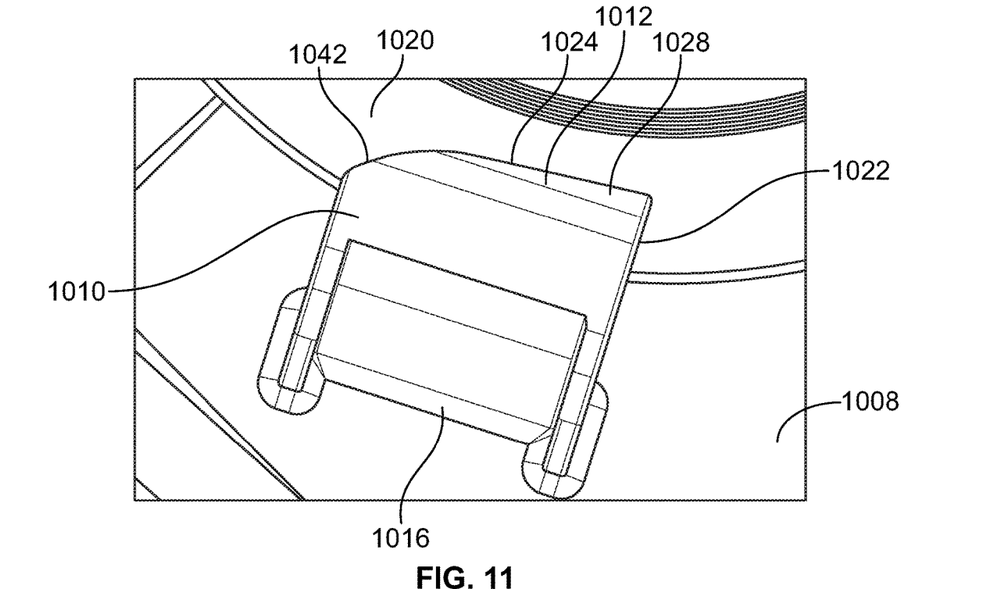
FIG. 11 illustrates a zoomed in perspective view of the reservoir cap closure indicator system of FIG. 10.

FIGS. 10 and 11 illustrate a reservoir cap closure indicator 1002, according to another embodiment of the present disclosure. FIG. 10 illustrates a perspective view of a reservoir cap closure indicator system 1000. FIG. 11 illustrates a zoomed in view of a section of the reservoir cap closure indicator system 1000 of FIG. 10.

The reservoir cap closure indicator system 1000 includes a cap 1004 that includes a pronounced cap detent 1024 that extends a distance away from an exterior surface of the cap 1004. The cap 1004 is coupled to a neck of a reservoir body 1008. The system 1000 includes the reservoir cap closure indicator 1002 having an indicator 1010 that is shown as a flexible spring arm that is coupled with the reservoir body 1008. The indicator 1010 (e.g., the spring arm) corresponds to the cap detent 1024 when the cap 1004 is fully installed onto the neck of the reservoir body 1008.

The reservoir cap closure indicator 1002 includes a body 1006 that has an arm 1016 that upwardly extends away from the body 1008 in a direction substantially parallel to a center axis (not shown) of the cap 1004, and an alignment feature 1028 that extends in a direction substantially planar to a top side 1020 of the cap 1004. The reservoir cap closure indicator 1002 also includes a locking member 1012 that extends from the alignment feature 1028 and is configured to engage with the cap detent 1024.

In the illustrated embodiment, the indicator 1010 indicates when the body 1006 is in a first position or in a second position. When the cap 1004 is threaded onto the neck of the reservoir body 1008, the indicator 1010 deflects away from the center of the cap 1004 and glides along the exterior surface 1026 of the cap 1004 until the cap 1004 is threaded far enough for the locking member 1012 to engage the cap detent 1024.

As shown in FIG. 10, the indicator 1010 is shown as a spring arm that may have a geometry specifically designed to allow the spring to easily snap into the cap detent 1024 on one side of the cap 1004. For example, when the cap detent 1024 is reached, the locking member 1012 falls into the cap detent 1024 and the indicator 1010 snaps back into a non-deformed state and indicates that the body 1006 is in the second position (e.g., the cap 1004 is in an installed state).

Additionally, the cap detent 1024 includes a blocking surface 1022 that may prevent any additional over-travel thereafter on the other side of the cap 1004. For example, a rounded entry path 1042 may be formed into the cap detent 1024. The entry path 1042 allows the indicator 1010 to fall into a resting position within the cap detent 1024 as a result of the cap 1004 moving to an installed state. Alternatively, the indicator 1010 does not fall into the cap detent 1024 when the cap 1004 is in an uninstalled state. The blocking surface 1022 on one side of the cap detent 1024 provides a firm stopping point, preventing any further tightening or turning of the cap 1004. Additional material may be added to the cap 1004 near the blocking surface 1022 of the cap detent 1024 to further prevent any unwanted over-travel of the cap 1004 after the indicator 1010 has seated in relation to the cap detent 1024.

Figure 12:
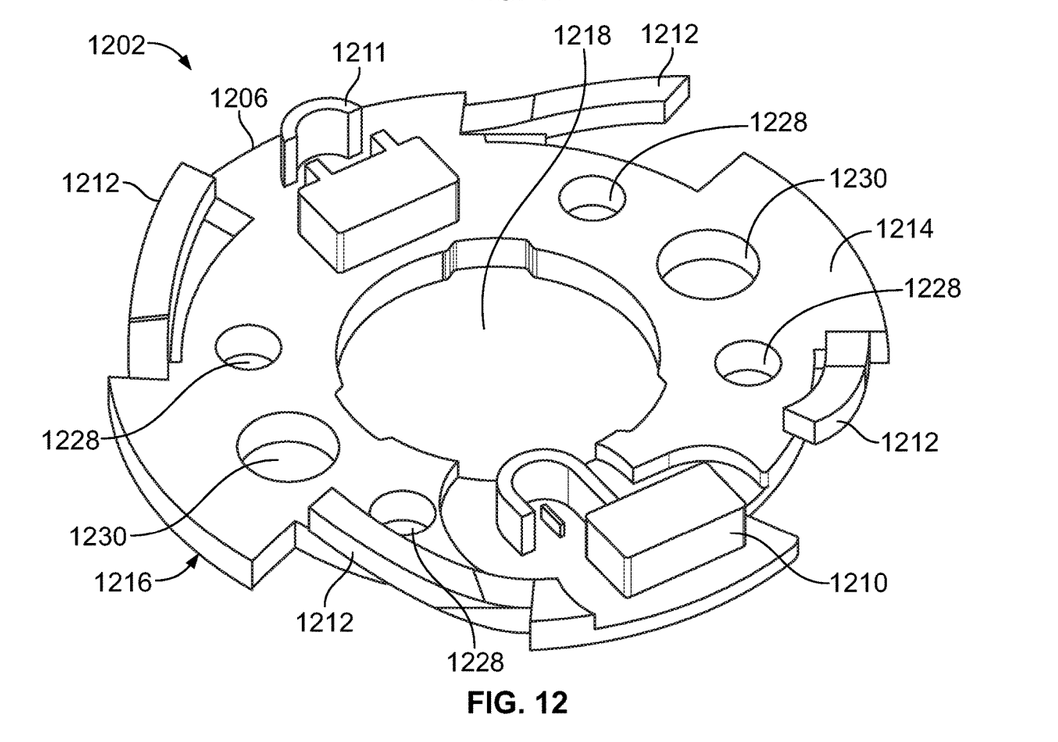
FIG. 12 illustrates a perspective view of a reservoir cap closure indicator, according to a further embodiment of the present disclosure.
Figure 13:
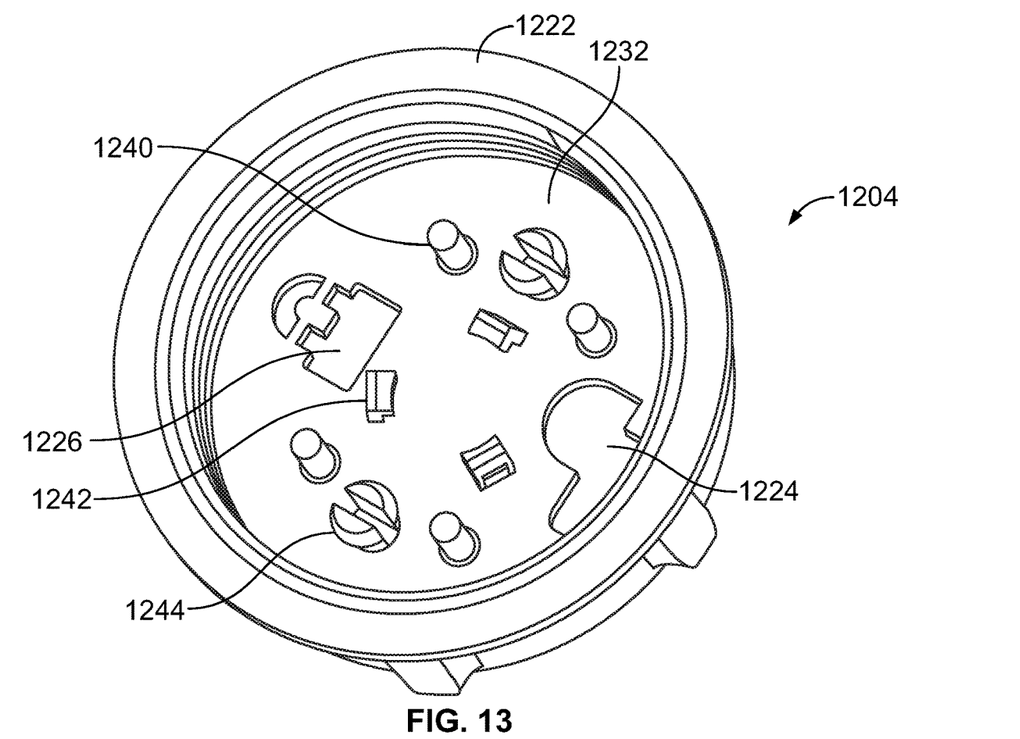
FIG. 13 illustrates a perspective view of a cap.
Figure 14:
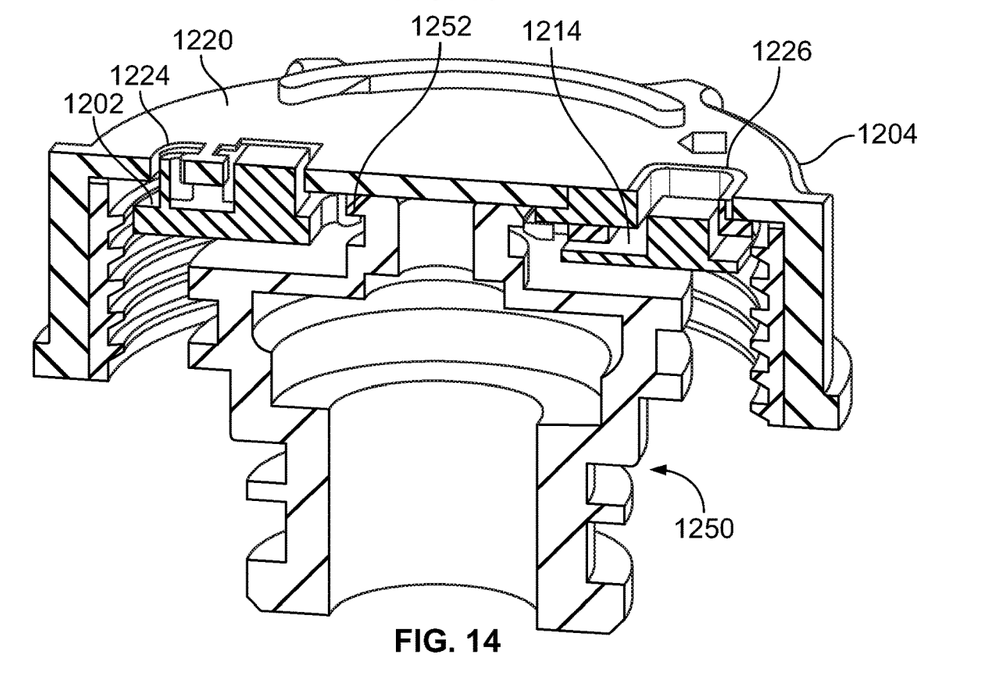
FIG. 14 illustrates a cross-sectional view of the reservoir cap closure indicator of FIG. 12 disposed inside the cap of FIG. 13.

FIGS. 12 through 14 illustrate a reservoir cap closure indicator 1202, according to another embodiment of the present disclosure. FIG. 12 illustrates a perspective view of the reservoir cap closure indicator 1202. FIG. 13 illustrates a perspective view of a cap 1204. FIG. 14 illustrates a cross-sectional view of the reservoir cap closure indicator 1202 disposed inside the cap 1204.

The reservoir cap closure indicator 1202 includes a top side 1214 and an opposite bottom side 1216 with a passage 1218 extending therethrough. A body 1206 of the reservoir cap closure indicator 1202 includes plural alignment features 1228, 1230 that are passages that extend between the top and bottom sides 1214, 1216. Additionally, the cap 1204 includes alignment pins 1240 and holding snap brackets 1244 that extend downwardly a distance away from an interior surface 1232 of the cap 1204. The alignment features 1228 are shaped, sized, and oriented to mate with the corresponding alignment pins 1240 and the alignment features 1230 are shaped, sized, and oriented to mate with the holding snap brackets 1244, as will be discussed in greater detail below. In alternative embodiments, the cap 1204 and/or the reservoir cap closure indicator 1202 may have alternative corresponding alignment or coupling features to couple the reservoir cap closure indicator 1202 with the cap 1204.

The reservoir cap closure indicator 1202 includes a first indicator 1210 and a second indicator 1211 that are coupled to and extend upwardly away from the top side 1214. The first and second indicators 1210, 1211 are shaped and sized to extend through first and second channels 1224, 1226, respectively, in the cap 1204. In the illustrated embodiment, the first indicator 1210 has a geometry of an unlocked logo or indicator, and the second indicator 1211 has a geometry of a locked logo or indicator. Optionally, the first and second indicators 1210, 1211 may have any other various geometric shapes, tabs, text, etc. and/or contrasting color(s).

The reservoir cap closure indicator 1202 also includes plural locking members 1212 that are shown as spring tabs. The spring tabs engage with the interior surface 1232 of the cap 1204 and create a force that translates the reservoir cap closure indicator 1202 axially into a position indicating an unlocked state. In alternative embodiments, various geometries may be used to return the reservoir cap closure indicator 1202 to a default (e.g. unlocked) position so that the locked logo (e.g., the second indicator 1211) is only indicated when the cap 1204 is fully installed onto the reservoir. In the illustrated embodiment, the body 1206, the locking members 1212, and the first and second indicators 1210, 1211 are integrally formed as a unitary component. In alternative embodiments, the locking members 1212 and/or the indicators 1210, 1211 may be separate components that may be coupled with the body 1206 of the reservoir cap closure indicator 1202.

The reservoir cap closure indicator 1202 is disposed inside the cap 1204 such that the top side 1214 of the reservoir cap closure indicator 1202 faces toward the interior surface 1232 of the cap 1204. The alignment pins 1240 and the holding snap brackets 1244 of the cap 1204 hold the reservoir cap closure indicator 1202 in a position inside the cap 1204. The alignment pins 1240 and the holding snap brackets 1244 also limit the travel of the reservoir cap closure indicator 1202 within the cap 1204. The passage 1218 of the reservoir cap closure indicator 1202 is shaped and sized to be coupled to an internal valve 1250, as shown in FIG. 14. The internal valve 1250 also includes valve locking tabs 1252 that are coupled with valve locking members 1242 that extend a distance away from an interior surface 1232 of the cap 1204. The valve locking members 1242 near the center of the cap 1204 hold the internal valve 1250 in place and allow relative radial motion between the valve 1250 and the reservoir cap closure indicator 1202 as the cap 1204 is threadably coupled with the reservoir. In alternative embodiments, additional pins may be positioned about the interior surface 1232 of the cap 1204.

The first indicator 1210 extends through the first channel 1224 when the body 1206 is in the first position (e.g., the cap 1204 is in an uninstalled state). When the cap 1204 is in the installed state, the neck of the reservoir (not shown) translates the reservoir cap closure indicator 1202 axially into a position indicating the installed or locked state. For example, the second indicator 1211 extends through the second channel 1226 when the body 1206 is in the second position and the cap 1204 is in the installed state.

Figure 15:
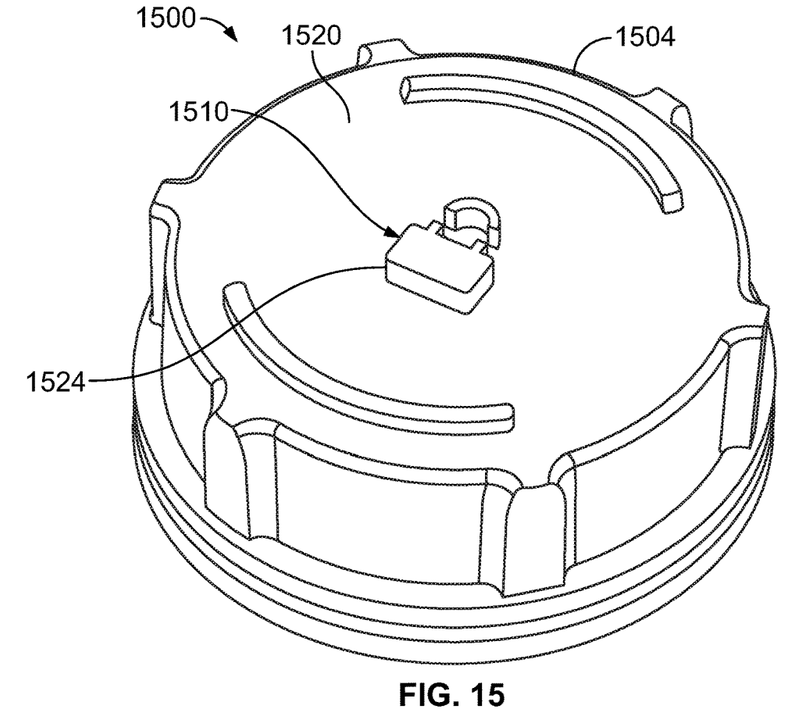
FIG. 15 illustrates a perspective view of a reservoir cap closure indicator system, according to another embodiment of the present disclosure.
Figure 16:
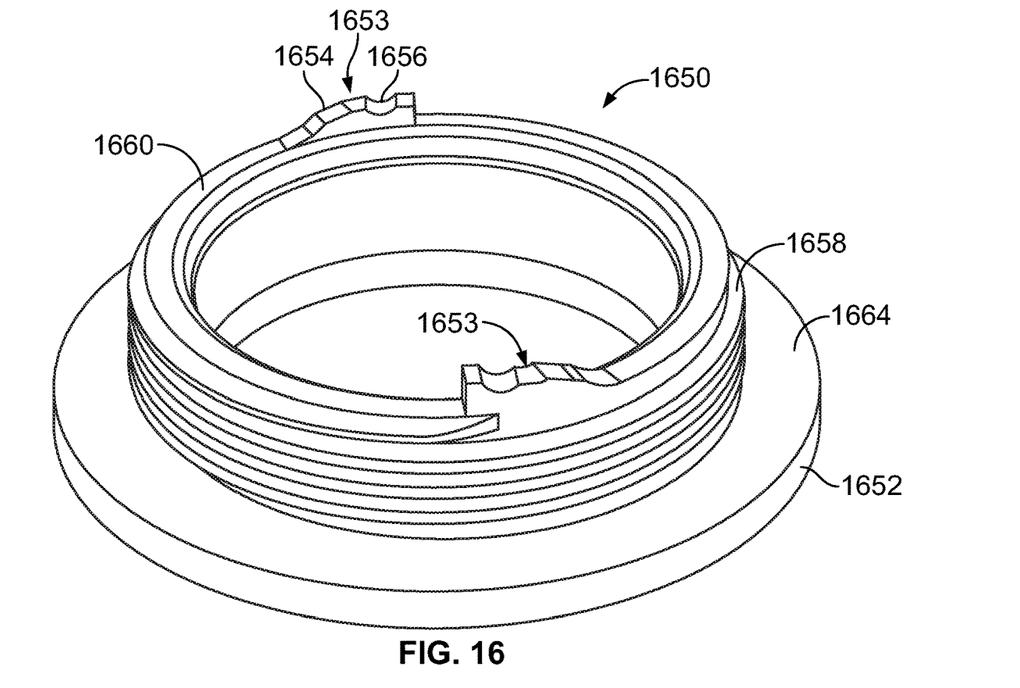
FIG. 16 illustrates a perspective view of a fill neck.
Figure 17:
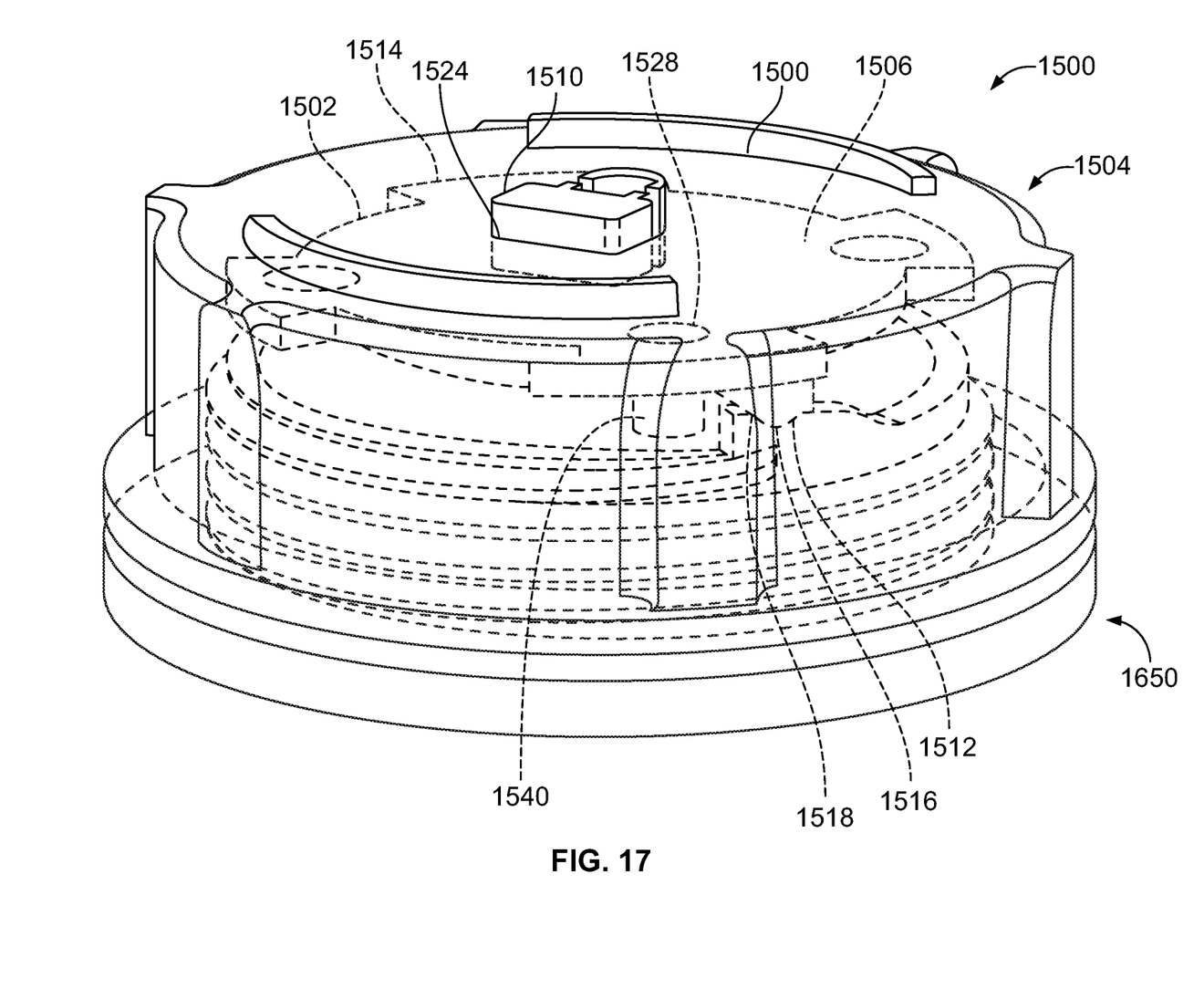
FIG. 17 illustrates a wire-frame perspective view of the reservoir cap closure indicator system of FIG. 15.

FIGS. 15 through 17 illustrate a reservoir cap closure indicator system 1500 according to another embodiment of the present disclosure. FIG. 15 illustrates a perspective top view the reservoir cap closure indicator system 1500 having a cap 1504 and a reservoir cap closure indicator 1502. FIG. 16 illustrates a perspective view of a fill neck 1650. FIG. 17 illustrates a wire-frame perspective view of the reservoir cap closure indicator system 1500.

Referring to FIGS. 15 through 17, the fill neck 1650 includes protuberances 1653 extending from an upper surface 1664 of a rim 1652. Each protuberance 1653 includes a lead-in ramp 1654 coupled to a neck detent 1656. The protuberances 1653 upwardly extend from an upper edge 1660 of a threaded tube 1658. The annular rim is devoid of a molded tab. In alternative embodiments, the fill neck 1650 may include less than two or more than two protuberances, and each protuberance may have a unique or common shape with each other protuberance.

The reservoir cap closure indicator 1502 is disposed inside the cap 1504 between the cap 1504 and the fill neck 1650. A body 1506 of the reservoir cap closure indicator 1502 includes alignment features 1528 that correspond to alignment pins 1540 of the cap 1504. The reservoir cap closure indicator 1502 also includes an indicator 1510 that is coupled to the body 1506 and indicates the position of the reservoir cap closure indicator 1502 as the body 1506 moves between a first position and a second position. In the illustrated embodiment, the indicator 1510 is disposed near the center of the top side 1514 of the reservoir cap closure indicator 1502 and corresponds to a channel 1524 of the cap 1504.

A locking member 1512 of the reservoir cap closure indicator 1502 extends downwardly from a bottom side of the body 1506 of the reservoir cap closure indicator 1502. The locking member 1512 includes a ramp 1518 and a detent 1516 that correspond to the lead-in ramp 1654 and the neck detent 1656 of the fill neck 1650. As the cap 1504 is rotated into a secure position with respect to the fill neck 1650, the body 1506 of the reservoir cap closure indicator 1502 is upwardly pushed by the protuberances 1653, thereby upwardly extending the indicator 1510 (e.g., the lock icon) through the channel 1524 of the cap 1504. The neck detent 1656 receives the reciprocal detent 1516 of the locking member 1512 extending downwardly from the body 1506 when the cap 1504 is in the fully secured state, thereby providing tactile feedback that the cap 1504 is fully secured to the fill neck 1650.

Figure 18:
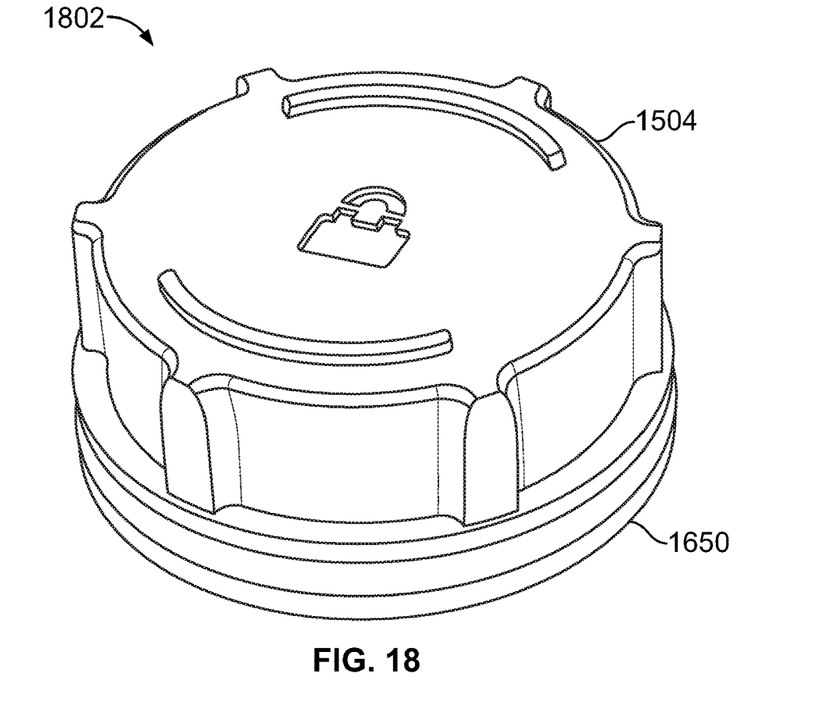
FIG. 18 illustrates a reservoir cap closure indicator in a first position.
Figure 19:
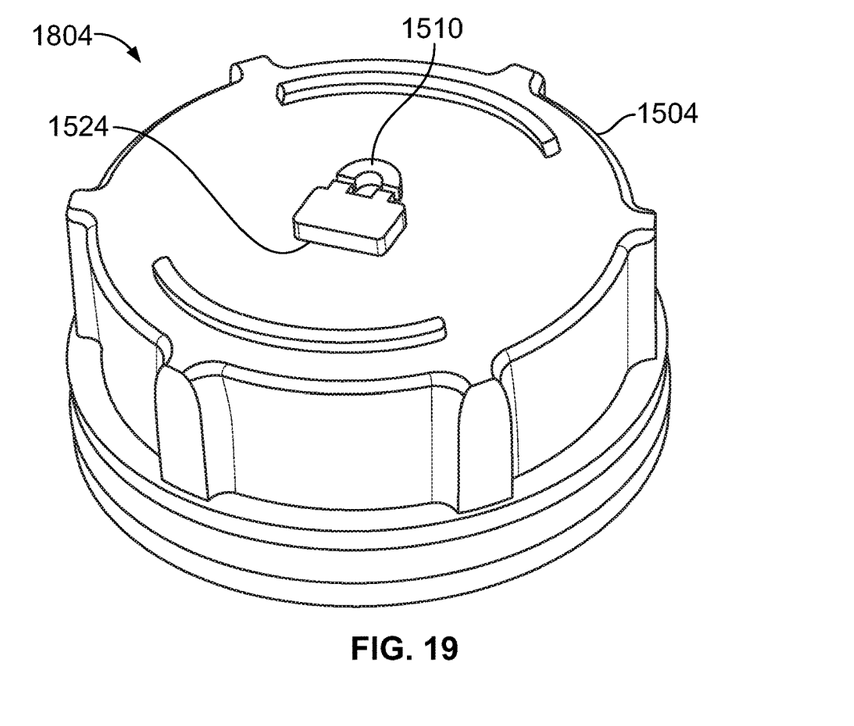
FIG. 19 illustrates a reservoir cap closure indicator in a second position.

FIG. 18 illustrates the reservoir cap closure indicator 1502 in a first position 1802. FIG. 19 illustrates the reservoir cap closure indicator 1502 in a second position 1804. In the unsecured state when the reservoir cap closure indicator is in the first position 1802, the indicator 1510 is recessed into the top side 1520 of the cap 1504. In the fully secured state when the reservoir cap closure indicator 1502 is in the second position 1804, the indicator 1510 upwardly extends through the channel 1524 and from the top side 1520 of the cap 1504. For example, the indicator 1510 is a visible indicator that is visible to an operator outside of the cap 1504 at the top side 1520 of the cap 1504 when the cap 1504 is in the fully secured state.

The protuberances 1653 of the fill neck 1650 are configured to quickly raise the body 1506 of the reservoir cap closure indicator 1502 and therefore the indicator 1510 in relation to the cap 1504. The cap 1504 need not be turned numerous times to slowly raise the indicator 1510. Instead, the indicator 1510 quickly upwardly extends through the channel 1524 at once as the cap 1504 moves to the fully secured position, via the interaction of the protuberances 1653 and the locking member 1512.

As described herein, embodiments of the present disclosure provide a reservoir tank cap closure indicator that readily and easily identifies a closure status of a cap onto a fill neck of a reservoir. Embodiments of the present disclosure provide advantages and alternatives over the prior art by providing reservoir cap closure indicators that provide visual and/or audible indicators that the cap is in a fully installed and closed condition. Thus, an individual is not dependent exclusively upon interference and feel to confirm proper closure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A reservoir cap closure indicator coupled to a cap and a reservoir, the reservoir cap closure indicator comprising:
   a body having at least one alignment feature, the body configured to move between a first position and a second position; and
   an indicator coupled to the body, wherein the indicator is configured to indicate a position of the body as the body moves between the first position and the second position, and
   wherein the body is configured to be disposed between the cap and the reservoir,
   wherein the cap is engaged with the at least one alignment feature as the body moves from the first position to the second position,
   wherein the indicator is configured to extend through a channel and above the cap when the body is in the second position, and
   wherein the body rotates with respect to the reservoir when the body moves between the first position and the second position.

2. The reservoir cap closure indicator of claim 1, wherein the at least one alignment feature is configured to align the body with the cap.

3. The reservoir cap closure indicator of claim 1, wherein the indicator is configured to indicate when the body is in the second position and when the body is not in the second position.

4. The reservoir cap closure indicator of claim 1, wherein the indicator is configured to indicate the position of the body as one or more of an audio indicator or a visual indicator.

5. The reservoir cap closure indicator of claim 1, wherein the body is configured to be disposed inside the cap, and the indicator is configured to be visible outside of the cap at a top side of the cap.

6. A reservoir and a reservoir cap closure indicator coupled to a cap, comprising:
   a reservoir having a fill neck with a rim having an upper surface, the upper surface including at least one protuberance having a neck detent;
   a body having a bottom side with at least one locking member with a reciprocal detent; and
   an indicator coupled to the body, wherein the indicator is configured to indicate a position of the body as the body moves between a first position and a second position,
   wherein the body is configured to be disposed between the cap and the reservoir,
   wherein the neck detent engages the reciprocal detent when the body is in the second position, and
   wherein the indicator is configured to extend through a channel and above the cap when the body is in the second position.

7. The reservoir and the reservoir cap closure indicator of claim 6, wherein the neck detent does not engage the reciprocal detent when the body is in the first position.

8. The reservoir and the reservoir cap closure indicator of claim 6, wherein the body rotates with respect to the fill neck when the body moves between the first position and the second position.

9. The reservoir and the reservoir cap closure indicator of claim 6, wherein the at least one protuberance includes a lead-in ramp, and the body moves toward or away from the upper surface when the reciprocal detent moves along the lead-in ramp as the body moves between the first position and the second position.

10. The reservoir and the reservoir cap closure indicator of claim 6, wherein the indicator is configured to withdraw into the channel and toward the fill neck when the body moves toward the first position.

11. The reservoir and the reservoir cap closure indicator of claim 6, wherein the fill neck has a first set of threads that is configured to engage a second set of threads of a cap as the body moves between the first position and the second position.

12. A reservoir cap closure indicator coupled to a cap and a reservoir, comprising:
   a cap having at least one alignment pin;
   a body having at least one alignment feature configured to engage the at least one alignment pin; and
   an indicator coupled to the body, wherein the indicator is configured to indicate a position of the body as the body moves between a first position and a second position,
   wherein the body is configured to be disposed between the cap and the reservoir,
   wherein the indicator is configured to extend through a channel and above the cap when the body is in the second position, and
   wherein when the body moves between the first position and the second position, the cap rotates with respect to the reservoir.

13. The reservoir cap closure indicator coupled to the cap of claim 12, wherein the cap includes a skirt with a first set of threads that are configured to engage a second set of threads of a fill neck of a reservoir.

14. The reservoir cap closure indicator coupled to the cap of claim 13, wherein the cap includes a top side that is connected to the channel.

15. The reservoir cap closure indicator coupled to the cap of claim 12, wherein the body has a top side and the indicator is disposed near the center of the top side.

16. The reservoir cap closure indicator coupled to the cap of claim 15, wherein when the body moves between the first position and the second position, the top side moves toward or away from a second top side of the cap.

17. The reservoir cap closure indicator coupled to the cap of claim 12, wherein when the body is in the second position, the cap is in a fully secured state.

18. The reservoir cap closure indicator coupled to the cap of claim 12, wherein the body includes a bottom side with at least one locking member with a reciprocal detent.

19. The reservoir cap closure indicator coupled to the cap of claim 12, wherein the reservoir cap closure indicator is disposed within the cap when the at least one alignment pin is engaged with the at least one alignment feature.

\* \* \* \* \*